United States Patent Office 3,813,321
Patented May 28, 1974

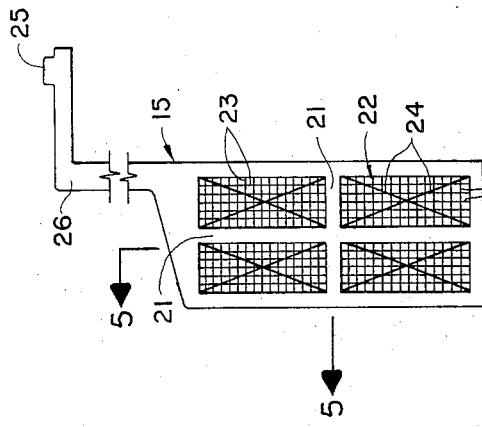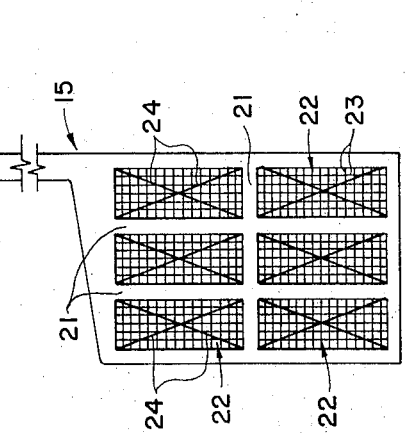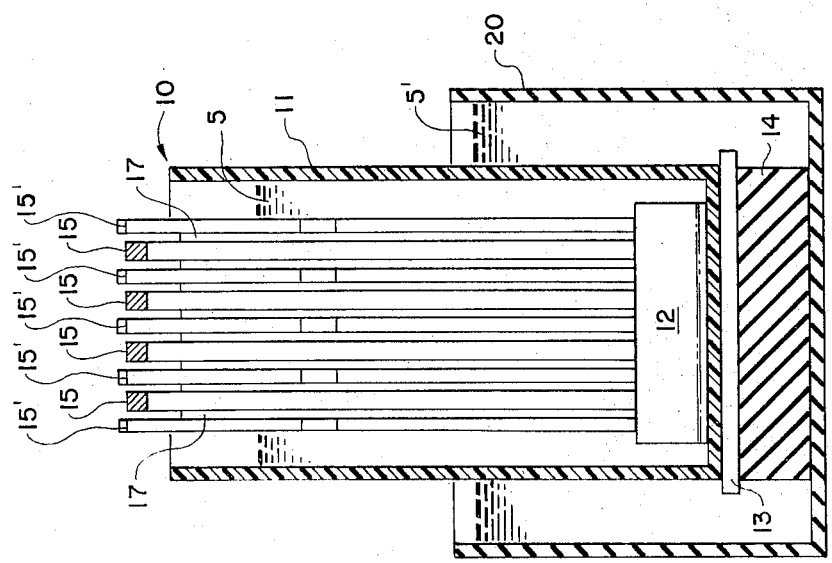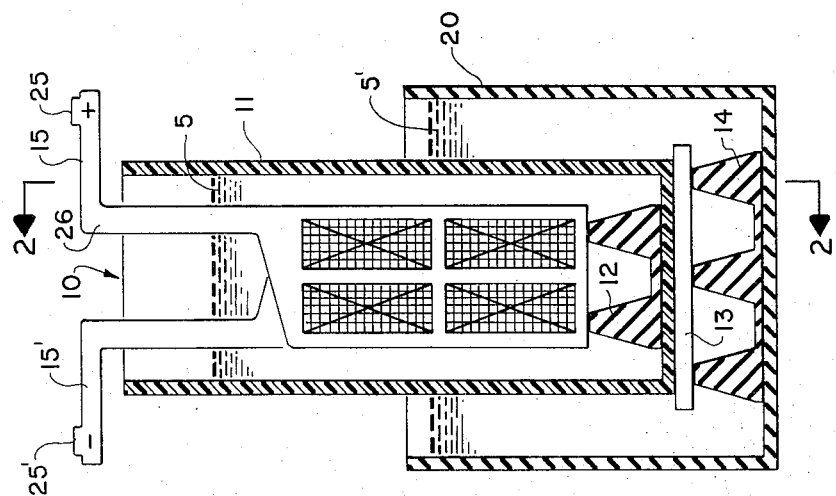

3,813,321
PROCESS FOR TREATING INDUSTRIAL WASTES
Simon Bastacky, 6604 Dalzell Place,
Pittsburgh, Pa. 15217
Filed June 28, 1973, Ser. No. 374,339
Int. Cl. B01k 1/00; C02c 5/12
U.S. Cl. 204—149
24 Claims

ABSTRACT OF THE DISCLOSURE

A process for treating industrial wastes containing sulfuric acid and metal constituents comprising subjecting the wastes to a cell equipped with a plurality of alternately positioned positive and negative lead-antimony alloy electrodes and charging the electrodes. The liquid portion of the waste is dissipated and a residue including the metallic constituents forms. A secondary process is also disclosed comprising the steps of placing additional pickle liquor in a secondary processing tank, contacting the pickle liquor in the secondary processing tank with the exterior wall of the cell, and conducting thermal energy through the cell wall to the pickle liquor in the secondary tank wherein the liquid portion of the liquor in the secondary processing tank is dissipated and a residue including the metallic constituents forms within the secondary tank. The metallic constituents may be reclaimed by a drying step or by an ignition step.

---

My invention relates to a process for treating industrial wastes and, more particularly, to a process for reducing spent sulfuric acid wastes containing metal constituents to solid residue. The process is of the type generally disclosed in my co-pending application, Ser. No. 21,377, filed Mar. 20, 1970.

Modern-day ecologists are raising the cry of environmental pollution with considerable emphasis on the pollution of our water resources. A major pollutant of our water resources are the industrial wastes which result from employing sulfuric acid to treat various products. For example, a concentrated sulfuric acid pickle bath for steel processing soon loses its effectiveness and must be continually replaced and/or replenished with fresh acid. The used acid, termed "spent pickle liquor" is directly or indirectly disposed of in our streams, rivers, and lakes.

Various forms of evaporators, condensators, diluters and neutralizers have been employed on these industrial wastes, but the effectiveness of these processes is, at best, minimal for the pollution continues at a record pace. In addition, the cost of electrical energy is often high, thereby lessening the attractiveness of these processes to the everyday user.

My invention eliminates this aspect of pollution of our water resources by reducing the wastes to a solid residue. My invention employs simple, yet efficient means for reducing these wastes to a solid residue. My invention also permits the reclamation of a metal where a metal was removed in the industrial process. My invention is amenable to a batch-type operation or a continuous-type operation, whichever is preferred. In addition, my invention requires a minimum amount of electrical energy, thereby making it competitive with existing processes which are less efficient.

My invention is a process for treating spent sulfuric acid industrial wastes by a combination of evaporation and electrolysis. The wastes are treated in cells having a plurality of alternately positioned positive and negative lead-antimony alloy electrodes. The electrodes can be in plate form, corrugated sheet form, pipe form or a combination thereof. Direct current is applied and the polarity of the electrodes can be changed to preserve the electrodes. A solid residue forms which can be further reduced by a drying step or an ignition step and the metal removed by cleaning or pickling can thus be reclaimed. The cells may also have secondary processing tanks associated therewith. Spent wastes are placed into the secondary processing tanks; the liquid wastes contacting the exterior walls of the cells. Thermal energy is conducted through the cell walls to the liquid wastes in the secondary processing tanks which causes the further dissipation of liquid wastes and the formation of a solid residue in the secondary tanks.

In the accompanying drawings, I have shown my presently preferred embodiment of my invention in which:

FIG. 1 is a sectional elevation view of one end of a cell and secondary processing tank employed in the process of my invention;

FIG. 2 is a section taken along line 2—2 of FIG. 1;

FIG. 3 is a side elevation of one presently preferred embodiment of an electrode used in the process of my invention;

FIG. 4 is a side elevation of another electrode similar to that of FIG. 3;

Figure 7:
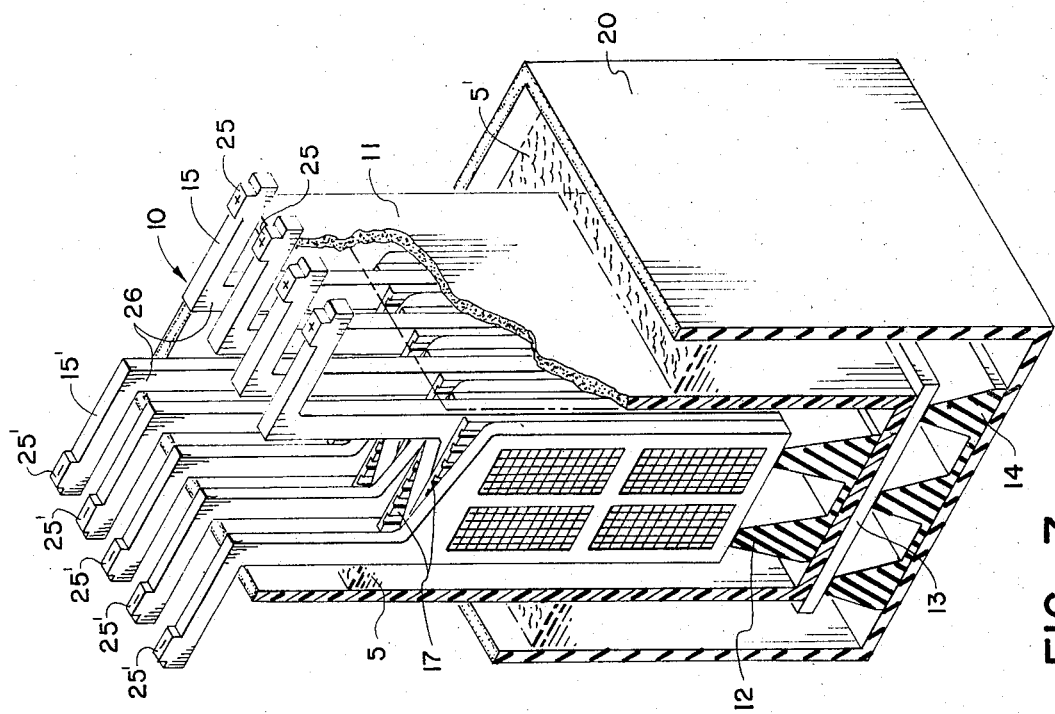
FIG. 7 is a sectional perspective view of a cell and secondary processing tank.

My invention has general application to the treatment of industrial waste containing sulfuric acid and specific application to the pickling or cleaning of metals with sulfuric acid. The general application of my invention is in areas such as industrial mine wastes and wood pulp processing wastes where sulfuric acid is employed or is present. The specific application is in the area of metal processing and, therefore, for purposes of illustration, I will describe the invention in respect of "spent pickle liquor," which is the result of pickling steel in sulfuric acid. Such a spent pickle liquor contains as major constituents, sulfuric acid, iron, as ferrous sulfate, and the balance primarily water, with other incidental impurities. Sulfuric acid produces satisfactory results in continuous pickling baths, provided the iron concentration in the bath stays below a certain maximum, generally about 8% by weight. In general, pickling efficiency decreases with time because the reaction of scale and basic metal with the sulfuric acid solution depletes the acid concentration while proportionally increasing the ferrous sulfate concentration. Increased concentration of ferrous sulfate tends to inhibit the activity of the acid and reduces the effectiveness of the solution for cleaning and brightening steel.

Once the pickling liquor reaches a given concentration of ferrous sulfate it is rendered ineffective for pickling. The spent pickle liquor is then removed from the bath and a fresh sulfuric acid solution is introduced. Spent sulfuric acid pickle liquor generally contains sulfuric acid ($H_2SO_4$), ferrous sulfate ($FeSO_4$) and the balance primarily water ($H_2O$) with trace impurities therein. Several samples of spent pickle liquor were obtained from two steel mills and were analyzed in order to determine the chemical constituents in solution. The analysis was as follows:

|  | Sample | | | | |
|---|---|---|---|---|---|
|  | A | B | C | D | E |
| Sample: |  |  |  |  |  |
| Wt., g./ml | 1.177 | 1.175 | 1.195 | 1.238 | 1.149 |
| Fe, gms./liter | 52.0 | 45.55 | 41.8 | 58.87 | 57.5 |
| $FeSO_4$, gms./liter | 141.4 | 123.9 | 113.7 | 160.1 | 156.4 |
| $H_2SO_4$, gms./liter | 145.5 | 90.12 | 85.0 | 134.3 | 16.26 |
| Specific gravity, weight percent | N.A. | 1.175 | N.A. | 1.240 | 1.050 |
| Fe, percent * | 4.2 | 4.8 | 3.2 | 4.7 | 5.5 |
| $FeSO_4$, percent | 11.4 | 13.1 | 8.7 | 12.7 | 14.9 |
| $H_2SO_4$, percent | 12.3 | 7.6 | 7.1 | 10.8 | 1.54 |
| Total ($FeSO_4$ + $H_2SO_4$), percent | 23.7 | 20.7 | 15.6 | 23.5 | 16.4 |
| $H_2O$, percent (By difference) | 76.3 | 79.3 | 84.40 | 76.5 | 83.6 |

* Combined as $FeSO_4$.

I have found that subjecting these spent pickle liquors to lead-antimony electrodes results in a combination of evaporation and electrolysis which forms a solid residue, thereby eliminating or altering all the liquid constituents.

My process is carried out in electrically insulated containers referred to as cells. These cells are filled with a spent pickle liquor. A plurality of alternately positioned positive and negative lead-antimony alloy electrodes are positioned in the cell much in the same way as a storage battery is constructed. The shape and number of the electrodes are very important in that the process both combines electrolysis and evaporation and, therefore, an increase in surface area of the electrodes increases the overall speed of the process. The alloy composition of the electrodes is, likewise, very important. I have found that lead-antimony alloy electrodes produce a very efficient process wherein power consumption on the order 2–3 kilowatt-hours per gallon of spent pickle liquor is obtainable.

Figure 5:
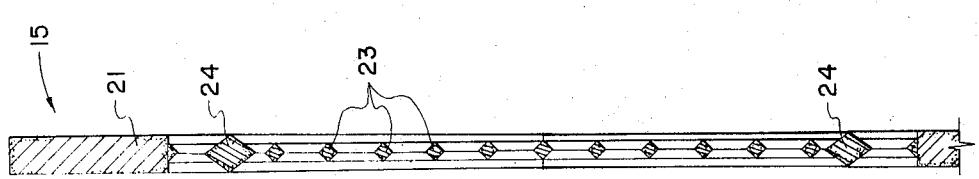
FIG. 5 is a sectional view taken along line 5—5 of FIG. 3.

Laboratory tests have been performed using electrodes of the general type shown in FIGS. 3–5. I have detected that there is some loss of material on the positive electrodes during operation, due possibly to dissociation and migration of certain elemental constituents from the positive to the negative electrodes. I, therefore, presently prefer to use positive electrodes which contain slightly higher percentages of alloying elements than that contained in the negative electrodes. Such as arrangement will increase the useful life of the postive electrodes. It can be appreciated, however, that the alloy composition for the positive and negative electrodes could be identical if desired. A presently preferred alloy range for the electrodes is about .

| Element | Positive electrode | Negative electrode |
|---|---|---|
| Antimony (Sb) | 6–15% | 4–10%. |
| Arsenic (As) | 0.4–0.75% | 0.1–0.2%. |
| Tin (Sn) | 0.2–0.7% | 0.15–0.2%. |
| Silver (Ag) | 0.01% max. | 0.01% max. |
| Iron (Fe) | 0.005% max. | 0.005% max. |
| Copper (Cu) | 0.2–0.5% | 0.2–0.5%. |
| Lead (Pb) | Balance * | Balance.* |

* Trace amounts of nickel (Ni), cobalt (Co), zinc (Zn) and mercury (Hg) are acceptable.

Each of the elemental alloy constituents individually influence the overall efficiency of the electrodes. For example, lead is relatively inexpensive while also being particularly suited as an electrode in corrosive environments. Antimony aids in the electrolytic action of the cell while it also strengthens and hardens the lead alloy. The arsenic addition tends to further protect the electrode from the corrosive action of the pickle liquor. The tin is added in order to aid in casing the electrodes. The molten alloy has improved casting and mold filling properties with the tin addition. The remaining alloy constituents, iron, silver, nickel, cobalt, zinc and mercury are present usually as naturally occurring constituents of the basic lead addition. The amounts of these tramp constituents in the electrode alloys should be kept as low as practicable, particularly the iron and silver since they tend to decrease the corrosion resistance of the electrodes.

The overall efficiency of the process is increased as the surface area of the electrodes contacting the pickle liquor is increased. A greater electrode surface area causes a greater amount of electrolytic action, which in turn generates additionl thermal energy within the cell. Increased electrolysis and thermal energy increase the rate at which the liquid portion of the pickle liquor is dissipated within the cell since hydrogen and oxygen are liberated during electrolysis and water vapor is simultaneously driven off by evaporation, induced by the thermal energy.

A presently preferred embodiment of the electrode employed in my process is shown in FIGS. 3–5. The electrode 15 is plate-like and generally rectangular in shape having a thickness in the range of about .180–.250 inches. Due to the tendency of the positive electrodes to lose material during the process, I prefer to use positive electrodes which have a greater thickness than the negative electrodes. In this respect I prefer a thickness of about .250 inches for the positive electrodes and a thickness of about .180–.200 inches for the negative electrodes. The width and length of electrode 15 may vary according to the physical size of the cell and particular application. As can be seen, electrode 15 of FIG. 3 is not as wide as electrode 15 of FIG. 4. Electrode 15 of FIG. 4 would, therefore, have a higher current carrying capacity than electrode 15 of FIG. 3 due to its greater mass and would thus be suitable for use in larger tanks. Electrodes 15 are cast structures and contain heavy web sections 21 running vertically and horizontally thereon. Integrally positioned between web sections 21 are porous grid sections 22. Grid sections 22 are made up of fine cast rods 23 extending vertically and horizontally between web sections 21. Rods 23 have a square cross-sectional shape as shown in FIG. 5. This shape is preferred since it yields a greater surface area than that of a circular cross-section. Diagonally extending rod supports 24 are, likewise, integrally cast within grid sections 22 and attached to rods 23 and webs 21 to give added structural strength to rods 23. Rod supports 24 are of a heavier cross-section than rods 23 and thus aid in carrying and distributing electrical current over grid sections 22. The spaces between rods 23 are open to allow maximum electrode contact with the pickle liquor. Electrodes 15 also have a right angle neck portion 26 which is integral with webs 21. Neck 26 has an electrical connection 25 at its terminal end to permit attachment of a D.C. power source thereto. Neck 26 is preferably shaped as a right angle to permit the placement of connection 25 exterior of the cell 10 so as to lessen the chance for corrosion at the contacts 25, see FIG. 1. Due to the fact that hydrogen gas is given off during the process, it is preferable that the electrical connections at contacts 25 be made by welding. A welded connection greatly decreases the probability of sparking at contacts 25 and thus reduces the hazard of hydrogen explosion.

Various other physical forms of electrodes may be employed in my process. These electrodes may be in the form of flat plates or they may be corrugated to increase the surface area. The electrodes may also be rows of lead-antimony alloy pipes, or hollow cylinders.

Figure 9:
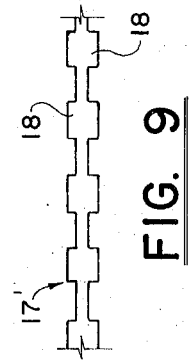
FIG. 9 is a partial plan view showing a slightly modified edge of an electrode spacer plate.

A suitable arrangement to carry out my process is as follows. As can best be seen in the perspective view of FIG. 7 a cell, generally designated 10, is shown. Cell 10 has an enclosure tank 11 into which are placed positive electrodes 15 and negative electrodes 15'. These electrodes are alternately positioned positive and negative and are connected at contacts 25 and 25' to a charger which will supply direct current, generally through a rectifier. A normal theoretical cell requires two volts, but to allow for the efficiency of the operation, I employ about 2½ volts per cell. Cell 10 of FIG. 7 contains 5 negative electrodes 15' and 4 positive electrodes 15. Spaced between electrodes 15 and 15' are plate-like porous separators 17 which contact adjacent faces of the electrodes. Separators 17 are porous so as to allow the pickle liquor to pass therethrough. Separators 17 may be constructed of rubber, plastic, fiberglass or wood or other material which is heat-resistant, corrosion resistant and of a high dielectric strength. The use of separators 17 in cell 10 permits spacing between electrodes 15 and 15' while permitting lower voltage and lighter electrodes to be utilized. The separators 17 are about .060 to 0.120 inches in thickness. Separators 17 may contain longitudinally extending ridge portion 18 on one or both flat faces thereof, see FIGS. 8 and 9. Ridges 18 permit the escape of gas bubbles generated by electrolysis adjacent electrodes 15' and 15.

Figure 8:
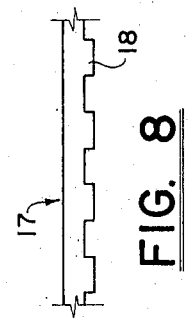
FIG. 8 is a partial plan view showing an edge of an electrode spacer plate.

The tank 11 is preferably constructed of a material which is heat resistant and corrosion resistant. The materials used in the cell construction must be capable of withstanding temperatures of at least 175° F. for prolonged periods without deforming; certain metals such as lead and stainless steel and certain plastic materials are acceptable for this purpose. In the embodiment of FIGS. 1, 2 and 7, cell 10 has a rubber or wooden bridge 12 positioned on the floor thereof to support the lower edges of the electrodes 15 and 15'. Bridge 12 also electrically insulates electrodes 15 and 15' from tank 11 which is required if tank 11 is constructed of metal. Cell 10 may then be filled with spent pickle liquor 5 and the electrodes charged with direct current. During the process, the electrolytic action of the cell causes the liberation of hydrogen gas and oxygen gas while at the same time creating thermal energy which raises the temperature of the bath. This increased thermal energy causes the dissipation of water as water vapor through evaporation. The spent pickle liquor 5 within tank 11 gradually dissipates and a solid residue containing ferrous sulfate, $FeSO_4$, forms within. Additional pickle liquor 5 may be added to tank 11 as the level of spent liquor decreases until such point as cell 10 is filled with solid residue. At this point the electrodes may be removed from cell 10 and the solid residue further processed in order to recover the metal constituents therein or the solid residue may be disposed of if desired.

While cell 10 operates very effectively as just described, the overall efficiency of the process is increased by utilizing a secondary processing tank 20. Secondary processing tank 20 surroundingly encloses cell 10. Cell 10 may be supported within secondary processing tank 20 by bridge 14 of rubber or wood and flat platform 13. Platform 13 is used to distribute the weight more evenly across the floor of tank 11 so as to prevent distortion of the floor, particularly if a plastic tank 11 is employed. Secondary processing tank 20 is filled with spent pickle liquor 5' whereby liquor 5' contacts the exterior wall of cell tank 11. During the process thermal energy is conducted through the wall of tank 11 to a pickle liquor 5' within secondary processing tank 20. The heat so transferred causes evaporation of the pickle liquor 5' within secondary tank 20. In this embodiment, it is preferable that the material used in the construction of tank 11 possess a high coefficient of thermal conductivity. In this regard certain corrosion resistant metals such as lead or stainless steel may be employed. The exterior wall of secondary processing tank 20 may be insulated so as to prevent loss of thermal energy therethrough and thus contain the useful heat within tank 20. While one embodiment of secondary processing tank 20 has been shown and described, it is obvious that certain variations could be made in order to achieve the same object. For example, the secondary processing tank could also be in the form of elongated troughs which surround the walls of tank 11.

Figure 6:
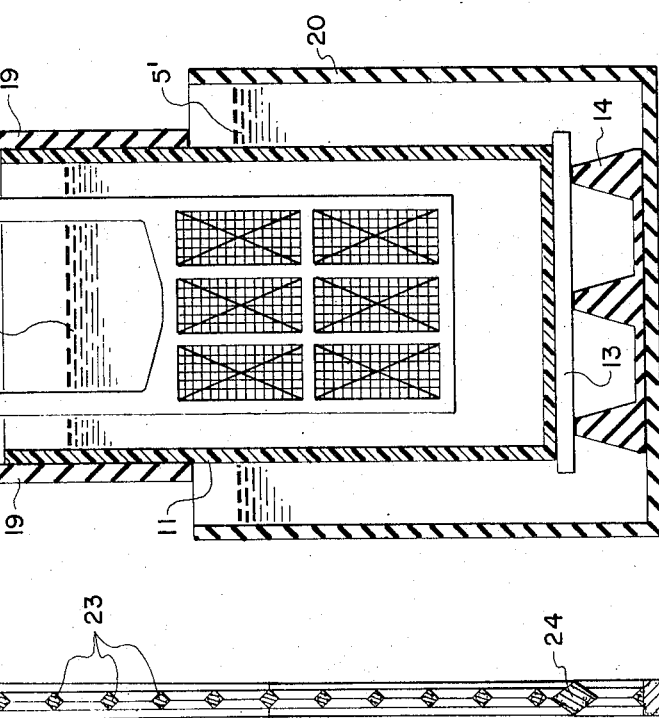
FIG. 6 is a sectional elevation view of one end of a cell and secondary processing tank showing a hanger type electrode mounted therein.

Referring now to FIG. 6, hanging electrode 16 is shown. In this embodiment electrode 16 contains two right angle neck portions 26 which are adapted to be hung on opposite sides of tank 11 in the manner shown. This embodiment does away with the need for electrode support bridge 12. Support members 19 may be fixedly attached at opposite sides of tank 11 in order to support the heavy weight of electrode 16, thereby preventing distortion at the top edge of tank 11. Support member 19 should, likewise, be constructed of a dielectric material so as to insulate electrodes 16 from tank 11, if tank 11 is metal.

The residue formed within cell tank 11 and within secondary processing tank 20 is substantially ferrous sulfate $FeSO_4$ plus water. The residue may be either disposed of or treated in order to recover the ferrous sulfate therein. The residue may be subjected to a drying oven at a temperature of about 130° C. In this manner dry ferrous sulfate is reclaimed which can later be utilized as a valuable additive to fertilizers, printing inks, medicine, water purification, iron oxide pigments, to mention a few. The residue could also be treated in an ignition furnace at a temperature of about 750° C. wherein ferric oxide $Fe_2O_3$ may be reclaimed and recycled in the steel mill.

Figure 12:
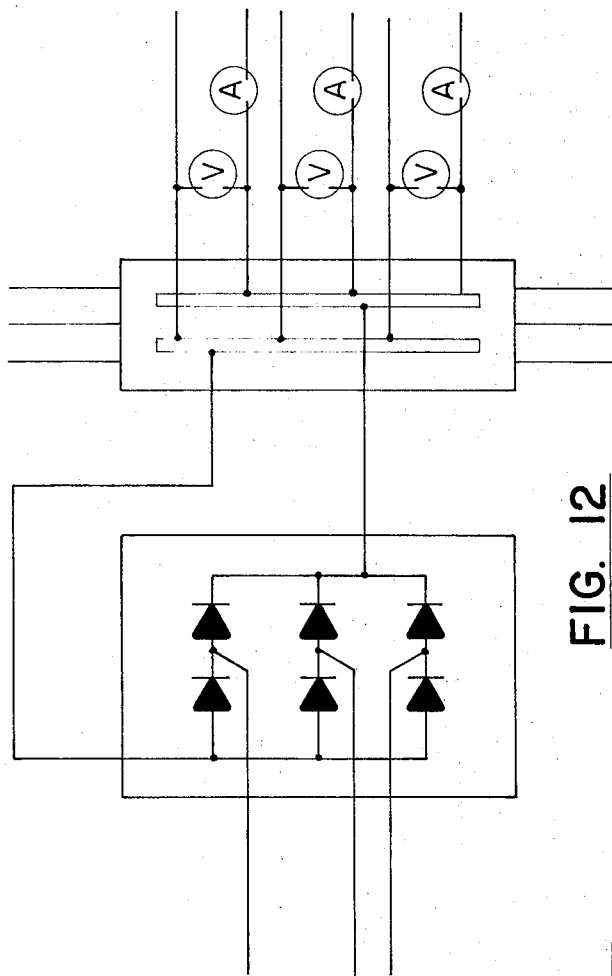
FIG. 12 is also a schematic wiring diagram of a 230 volt A.C. power supply suitable for use with my invention.
Figure 10:
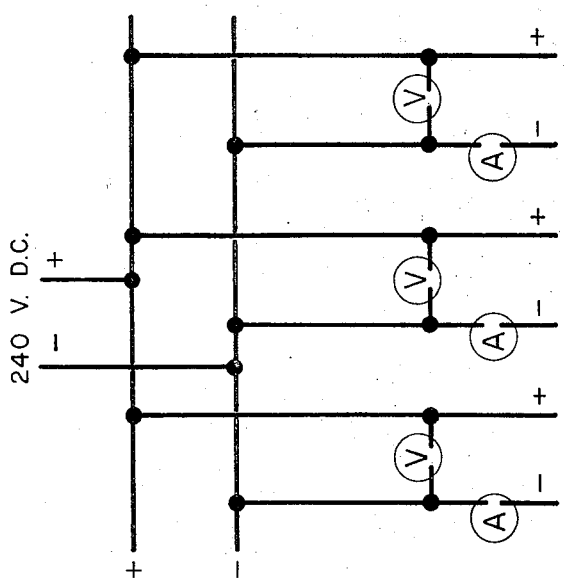
FIG. 10 is a schematic wiring diagram of a 240 volt D.C. power supply suitable for use with my invention.
Figure 11:
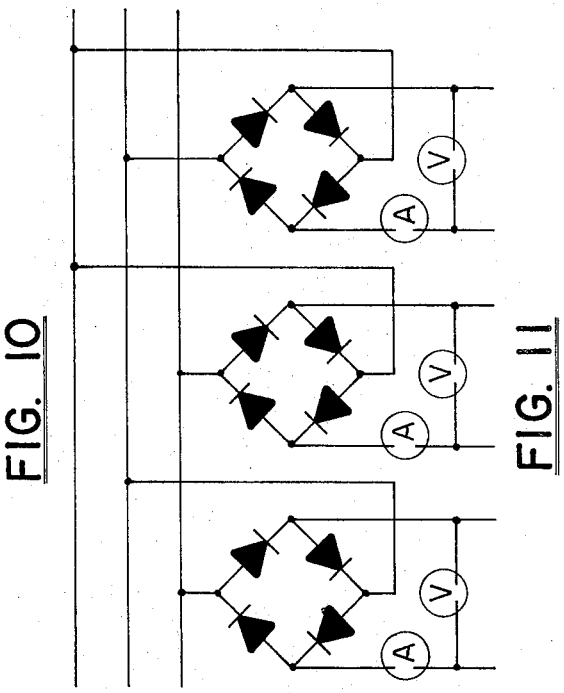
FIG. 11 is a schematic wiring diagram of a 230 volt A.C. power supply suitable for use with my invention.

A plurality of cells may be employed in my process. I employ about 2½ volts per cell so that the 240 volt D.C. station of FIG. 10 is capable of running about 100 cells on each of the three circuits shown, or a total of 300 cells. The 230 volt A.C. station of FIG. 11 is capable of running about 80 cells per circuit, a total of 240 cells. The 230 volt A.C. station of FIG. 12 is, likewise, capable of running a combined total of 240 cells.

Initially about 40–60 amps are required during the start-up period when the electrodes are building their polarity. As the evaporation and electrolysis takes place and the water is driven off, the amperage can be progressively decreased to about 20–40 amps.

My laboratory tests have shown that approximately 85% by weight of the starting material was removed, so for every 100 pounds of spent pickle liquor there is 15 pounds of residue containing about 75% ferrous sulfate, $FeSO_4$, and about 25% water, $H_2O$. The residue may be treated by a drying step to reclaim dry $FeSO_4$ or it may be ignited to obtain ferric oxide $Fe_2O_3$. In the ignition step the following occurs at 750° C:

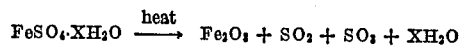
$$FeSO_4 \cdot XH_2O \xrightarrow{\text{heat}} Fe_2O_3 + SO_2 + SO_3 + XH_2O$$

Approximately 21% by weight $Fe_2O_3$ is obtained after ignition, with approximately 53.9% loss of $SO_2$ and $SO_3$ gases and 24.1% loss of $H_2O$ vapor.

I have taken the samples of spent pickle liquor obtained from the steel mills, the analyses of which were tabulated above, and have subjected them to my process in order to determine the kilowatt-hour of electricity required to reduce them to a solid residue. The results of my findings are tabulated in kilowatt-hours per gallon of pickle liquor processed. Tests were run using the cell alone and using the cell in conjunction with a secondary processing tank. Each test was run using three cells each having three positive and four negative electrodes connected in series and having a capacity of 9 quarts. The secondary processing tank had a capacity of 3 quarts. The results of my test follow:

| Sample | A | E | E | A[1] | A+E[1] |
|---|---|---|---|---|---|
| Room temp., °F | 70–75 | 70–75 | 80 | 80 | 68 |
| Cell temp., °F | 170 | 180 | 148 | 154 | 140–150 |
| Secondary process tank temp., °F | 130 | 140 | 116 | ([2]) | ([2]) |
| Volts, 3 cells | 5.5–7.75 | 7.0–8.5 | 6.4 | 5.6 | [3]11.7 |
| Amps, 3 cells | 25–47 | 25–47 | 30 | 30 | 50 |
| Process time, hours | 16 | 16 | 11 | 11 | 127 |
| Quantity of liquor processed in cell, quarts | 3 | 3½ | 3 | 2 | 65.5 |
| Quantity of liquor processed in secondary tank, quarts | 2½ | 2½ | 1 | 0 | 0 |
| Kilowatt-hours per gallon of liquor processed | 3.08 | 3.51 | 2.11 | 3.96 | 5.36 |

[1] Secondary processing tank not used.
[2] Not used.
[3] 6 cells.

Hence, the above results indicate that 2-3 kilowatt-hours per gallon of liquor processed is obtainable with the use of my process. The results also show that the secondary processing tank increases the efficiency of the process.

During processing, the specific gravity of the waste acid appreciably increases as the water constituent dissipates. Tests have shown that the specific gravity increases from about 1200 to 1500 through one half of a cycle. This acid can be recycled and reused as a subsequent dilution brings the impurity level within acceptable limits.

I claim:

1. A process for treating spent sulfuric acid pickle liquors containing metallic constituents comprising:
   A. subjecting liquors to a cell equipped with a plurality of alternately positioned positive and negative lead-antimony alloy electrodes; and
   B. charging the electrodes, to generate electrolysis and thermal energy within the cell, wherein the liquid portion of the pickle liquor dissipates and a residue including a sulfate of the metallic constituent forms.

2. The process of claim 1 including terminating the charging and removing the residue from the cell.

3. The process of claim 2 including drying the residue and reclaiming the metallic constituent as substantially a metallic sulfate.

4. The process of claim 2 including transferring the residue to an ignition furnace igniting the residue and reclaiming the metallic constituent as substantially a metallic oxide.

5. The process of claim 1 including replenishing the spent pickle liquor in the cell as it is dissipated and reclaiming the metallic constituent.

6. The process of claim 1 wherein the alloy composition of the electrodes is about 4 to 15% antimony, 0.1 to 0.75% arsenic, 0.15 to 0.7% tin, 0.2 to 0.5% copper, .010% max. silver, .005% max. iron and the balance of said composition being lead.

7. The process of claim 1 wherein the cell includes a plurality of porous separators positioned between the electrodes.

8. The process of claim 1 including placing additional pickle liquor in a secondary processing tank, contacting the pickle liquor in the secondary processing tank with the exterior wall of the cell containing the electrodes, and conducting thermal energy through said cell wall to the pickle liquor in the secondary processing tank wherein the liquid portion of the pickle liquor in the secondary processing tank is dissipated and a residue including a sulfate of the metallic constituent forms within said secondary processing tank.

9. A process for treating spent pickle liquor obtained from the pickling of steel in a sulfuric acid bath comprising:
   A. subjecting the pickle liquors to a cell equipped with a plurality of alternately positioned positive and negative lead-antimony alloy electrodes, said cell also equipped with a plurality of porous separators positioned between the electrodes; and
   B. charging said electrodes to generate electrolysis and thermal energy within the cell wherein the liquid portion is dissipated and a residue including ferrous sulfate forms.

10. The process of claim 9 wherein the electrodes are charged with about 2.5 volts per cell.

11. The process of claim 9 including directing about 40 to 60 amps to each cell and subsequently gradually reducing the amperage to about 20 to 40 amps as the pickle liquor is dissipated.

12. The process of claim 9 including terminating the charging and removing the residue from the cell.

13. The process of claim 12 including transferring the residue to a drying oven and drying the residue, wherein substantially ferrous sulfate is reclaimed.

14. The process of claim 13 wherein the residue is subjected to a temperature of about 130° C.

15. The process of claim 9 including terminating the charging and transferring the residue to an ignition furnace, igniting the ferrous sulfate residue and reclaiming the residue as substantially $Fe_2O_3$.

16. The process of claim 9 including replenishing the spent pickle liquor in the cell as it is dissipated and removing the residue.

17. The process of claim 9 wherein the alloy composition of the positive electrodes is about 6 to 15% antimony, 0.5 to 0.75% arsenic, 0.2 to 0.7% tin, 0.2 to 0.5% copper, .010% max. silver, .005% max. iron with trace amounts of nickel, cobalt, zinc, and mercury, and the balance of said composition being lead, and the alloy composition of the negative electrodes is about 4 to 10% antimony, 0.1 to 0.2% arsenic, 0.15 to 0.2% tin, 0.2 to 0.5% copper, .010% max. silver, .005% max. iron and the balance of said composition being lead.

18. The process of claim 9 including placing additional pickle liquor in a secondary processing tank, contacting the pickle liquor in the secondary processing tank with the exterior wall of the cell containing the electrodes, and conducting thermal energy through said cell wall to the pickle liquor in the secondary processing tank, wherein the liquid portion of the pickle liquor in the secondary processing tank is dissipated and a residue including ferrous sulfate forms within said secondary processing tank.

19. The process of claim 18 including replenishing the spent pickle liquor in the cell and secondary processing tank as it is dissipated and removing the residue from the cell and secondary processing tank.

20. The process of claim 18 including transferring the residue from the cell and secondary processing tank to a drying oven and drying the residue, wherein substantially ferrous sulfate is reclaimed.

21. The process of claim 20 wherein the residue is subjected to a temperature of about 130° C.

22. The process of claim 18 including transferring the residue from the cell and secondary processing tank to an ignition furnace, igniting the residue and reclaiming substantially $Fe_2O_3$.

23. The process of claim 22 wherein the residue is subjected to a temperature of about 750° C.

24. The process of claim 9 wherein dissipation of the liquid portion is interrupted and a remaining portion of liquid is removed for reuse.

References Cited
UNITED STATES PATENTS

| | | | |
|---|---|---|---|
| 2,793,182 | 5/1957 | Visnapuu | 204—130 |
| 3,622,478 | 11/1971 | Beyer | 204—130 |
| 3,761,369 | 9/1973 | Tirrell | 204—151 |

JOHN H. MACK, Primary Examiner

A. C. PRESCOTT, Assistant Examiner

U.S. Cl. X.R.
204—130